United States Patent [19]

Tomsu

[11] 4,411,403
[45] Oct. 25, 1983

[54] PIVOT SUPPORT BRACKET FOR MIRROR ASSEMBLY

[75] Inventor: David L. Tomsu, East Grand Rapids, Mich.

[73] Assignee: Keeler Brass Company, Grand Rapids, Mich.

[21] Appl. No.: 323,965

[22] Filed: Nov. 23, 1981

[51] Int. Cl.³ .................................. F16M 13/00
[52] U.S. Cl. .............................. 248/575; 248/619; D12/187; 74/501 M
[58] Field of Search .................. 74/501 M; 267/140.3; 248/466, 476, 475, 575, 608, 619, 620, 481, 560; D12/187

[56] References Cited

U.S. PATENT DOCUMENTS

| | | | |
|---|---|---|---|
| 3,235,294 | 2/1966 | Naylor et al. | 248/481 X |
| 3,391,895 | 7/1968 | Bausch et al. | 248/467 |
| 3,918,319 | 11/1975 | Mills | 74/491 |
| 3,993,281 | 11/1976 | McCarroll | 248/481 |
| 4,003,271 | 1/1977 | Stelma | 74/501 M |
| 4,112,784 | 9/1978 | Cosh | 74/501.5 R |
| 4,174,823 | 11/1979 | Sutton et al. | 248/582 |
| 4,189,956 | 2/1980 | Brubaker | 74/501 M |
| 4,218,037 | 8/1980 | Palamountain | 248/481 |
| 4,244,548 | 1/1981 | Sharp | 248/481 |

Primary Examiner—Lawrence J. Staab
Assistant Examiner—Frank H. McKenzie, Jr.
Attorney, Agent, or Firm—Varnum, Riddering, Schmidt & Howlett

[57] ABSTRACT

A mirror assembly for a vehicle comprises a housing (12) and a mirror assembly (18, 20) mounted therein. The housing includes attachment means (30, 32, 34, 36) for supporting the mirror (18, 20) in the housing (12). Support means (22) pivotably mounts the mirror assembly (10, 18) to the attachment means (30, 32, 34, 36). The support means (22) includes first and second arm means (40, 42, 44, 46) which mount the support means (22) to the attachment means (30, 32, 34, 36). The first arm means (44, 46) are mounted in tension and the second arm means (40, 42) are mounted in compression. The prestressing of the first and second arm means (40, 42, 44, 46) serves to reduce vibration of the mirror relative to the vehicle and thereby substantially reduce blurring of images on the mirror.

9 Claims, 7 Drawing Figures

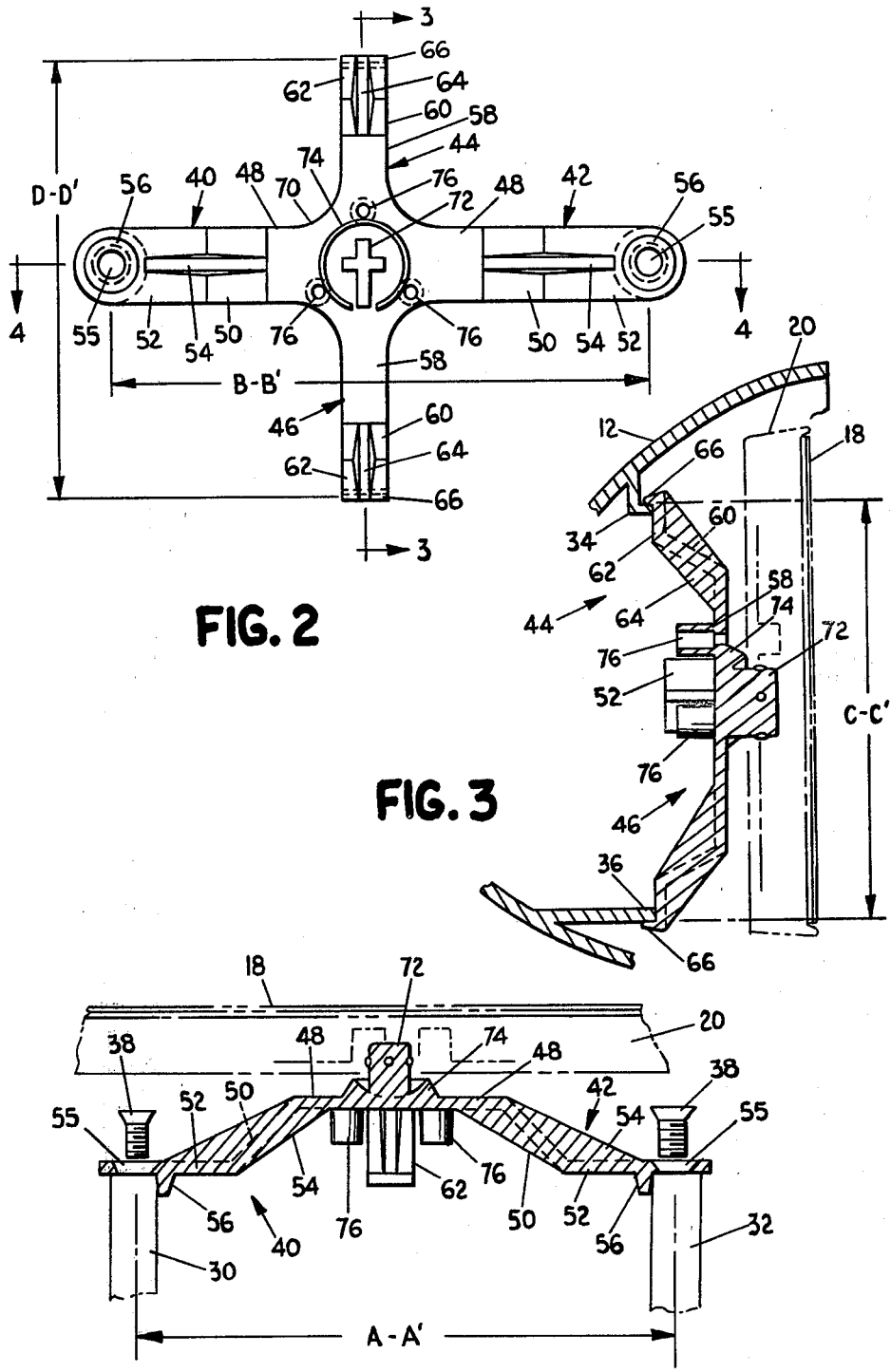

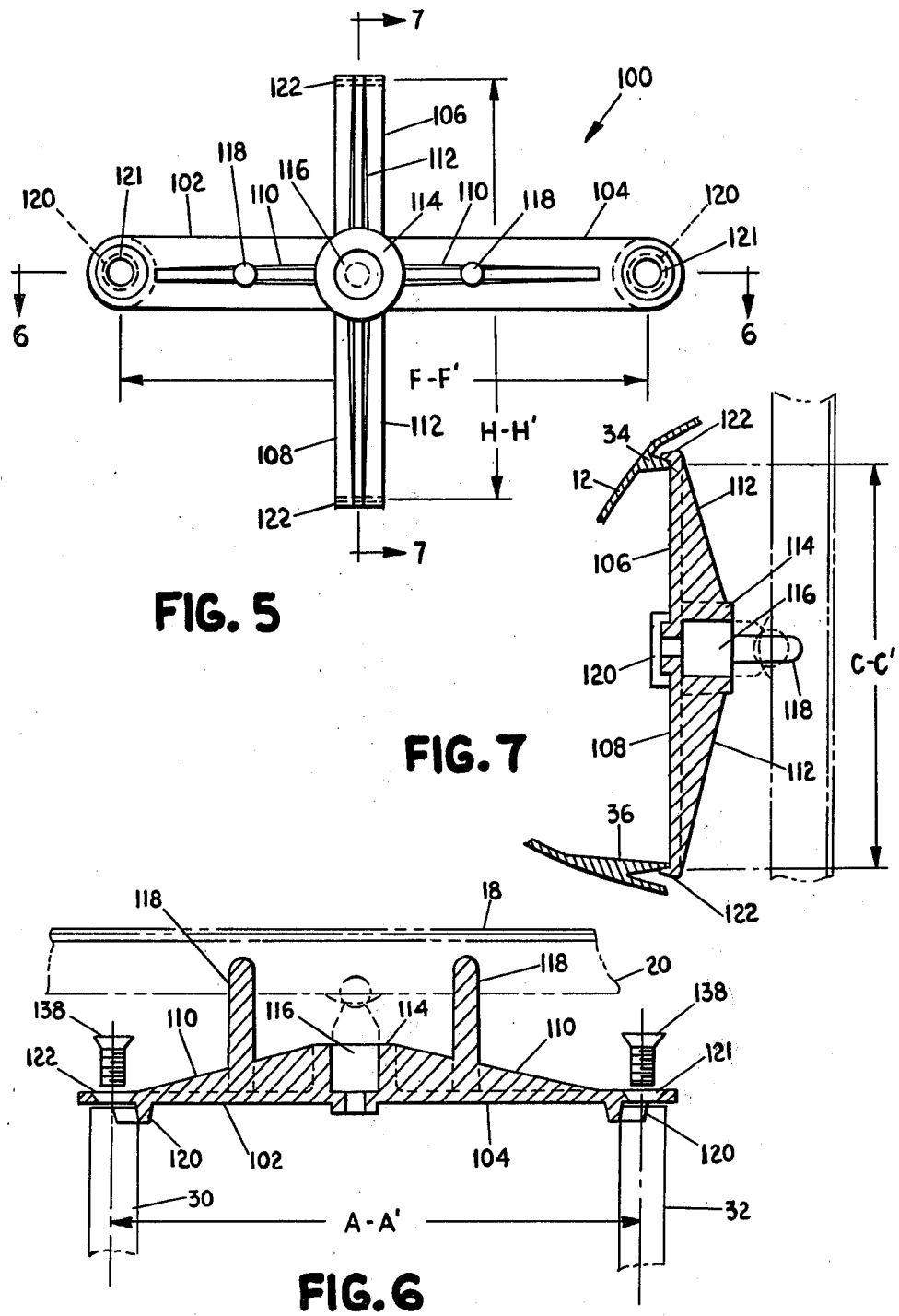

PIVOT SUPPORT BRACKET FOR MIRROR ASSEMBLY

DESCRIPTION

TECHNICAL FIELD

The invention relates to a mirror assembly for vehicles including a support means for pivotably mounting the mirror in its housing so as to minimize vibration of the mirror.

BACKGROUND ART

Mirrors commonly used on automotive vehicles are mounted to the side of the vehicle body in a fashion which allows for pivoting of the mirror for adjustment. Frequently, these mirrors are adjustable from the interior of the vehicle by means of a remote control device such as a Bowden wire control assembly. The mirrors also can be manually positioned from outside of the vehicle. In either case, the mirror is pivotably mounted to a base secured to the side of the vehicle. Since the mirror is supported on an arm secured to the vehicle, vibration of the mirror will occur during vehicle travel. When the vibrations of the mirror are not synchronized with the vibration of the vehicle, the images which are reflected in the mirror will become blurred. Accordingly, the mirror is not able to be used by the driver in a safe and easy fashion. The problem of vibration is enhanced when the mirrors are relatively large or heavy such as occurs when they are mounted in a housing as is often the case with a remotely controlled mirror. The same vibration problems exist in mirrors mounted on the passenger side of the vehicle. Accordingly, there is a need to eliminate or reduce this independent vibration of the mirror in order to enable the driver to use the mirror.

Various types of mountings for pivotably supporting a mirror have been suggested in the prior art. For example, Stelma, U.S. Pat. No. 4,003,271 issued Jan. 18, 1977, and commonly assigned with this application, discloses a mirror assembly wherein the mirror is mounted for pivoting movement in a fashion which reduces mirror vibration. The pivotal mounting for the mirror includes mating curved surfaces which function essentially as a ball and socket joint. Preferably, a cross-shaped projection extends from the mirror support into a corresponding recess in the rear of the mirror. The curved surfaces allow for a controlled rotation of the mirror while substantially reducing blurring of images due to vibration. The mirror shown in the Stelma patent is preferably controlled from the interior of the vehicle by means of a Bowden wire control.

The Cosh U.S. Pat. No. 4,112,784 patent, issued Sept. 12, 1978, describes another form of a cable control for rotating a mirror. The mirror is mounted to a backing plate having two outwardly extending legs which are secured to the interior of the mirror housing. The plate also includes two pivot pins and a centrally located taper pin which are received in an antirotation washer secured to the back surface of the mirror to minimize movement of the mirror during vehicle travel.

The Sutton et al U.S. Pat. No. 4,174,823 patent, issued Nov. 20, 1979, discloses another form of a remotely controlled mirror wherein the mirror housing is molded of a foam plastic material which is said to dampen the effects of vibration. The housing includes pillars which bear against the back of the mirror so as to dampen the effects of vibration and restore the mirror to an equalibrium position so as to minimize the effects of vibration.

The Brubaker U.S. Pat. No. 4,189,956 patent, issued Feb. 26, 1980, describes another form of a remotely controlled mirror having a projection extending from a bracket so as to pivotably support a mirror. The mirror includes a groove on its back surface which receives the projection.

While the above-referenced patents all describe pivotably mounted mirrors which in some cases may be remotely controlled, it is desirable to further reduce the effects of vibration on the mirror in order to prevent blurred images. Accordingly, it is desirable to support the mirror in a fashion which reduces the effects of vibrations while providing a pivotable mounting so as to allow for adjustment of the mirror.

DISCLOSURE OF THE INVENTION

In accordance with the invention, a mirror assembly for a vehicle comprises a housing in which a mirror is mounted. The housing includes attachment means for supporting the mirror within the housing. The mirror is mounted to the attachment means by a support means. The support means includes first and second arm means for mounting to the attachment means. One of the first and second arm means is mounted to the attachment means in tension while the other of the first and second arm means is mounted to the attachment means in compression. This preloading of the arms serves to reduce the vibration of the mirror relative to the vehicle and thus substantially reduce blurring of images on the mirror.

The arm means extend from a central hub of the support means. In one embodiment of the invention, the arm means are offset relative to the central hub. This offsetting of the arms allows for the formation of a shorter attachment means which can be in the form of studs integrally formed with the mirror housing.

The attachment means includes stud means which engage one of the first and second arm means arms. Further, the attachment means includes flange means which engage the other of the first and second arm means. The stud means are preferably elongate studs integrally formed with the housing during the casting thereof. The flange means are preferably lips or flanges integrally formed with the housing so as to mate with one of the first and second arm means. The arms which are secured to the stud means are secured by fastening means preferably in the form of threaded fasteners which are received in a bore in the stud means and pass through an aperture in the arms. In order to mount one pair of the arms in compression, the distance between the centerlines of the bores in the stud means is less than the distance between the centerlines of the apertures in the arms. Accordingly, when the support means is mounted in place, the stud means are spread apart and the arms are mounted in compression due to the slight difference in distances between the corresponding bores and apertures. The arms which are mounted to the flange means include a lip means which engages the flange means. In order to mount this set of arms in tension, the distance between the lip means is greater than the distance between the flange means. Accordingly, the support means is mounted so that the flange means and lip means engage each other and the difference in distances slightly spreads the arms apart to mount the arms in tension. In turn, the housing for the mirror is preloaded due to the reactive force of the lip means acting on the housing.

BRIEF DESCRIPTION OF DRAWINGS

The invention will be described with reference to the accompanying drawings wherein like members bear like reference numerals in which:

FIG. 2 is a front view of a first embodiment of a pivot support member which forms part of the mirror assembly shown in FIG. 1;

FIG. 3 is a cross-sectional view of the pivot support member of FIG. 2 taken along lines 3—3 of FIG. 2;

FIG. 4 is a cross-sectional view of the pivot support member of FIG. 2 taken along lines 4—4 of FIG. 2;

FIG. 5 is a front view of a second embodiment of a pivot support member in accordance with the invention;

FIG. 6 is a cross-sectional view of the pivot support member of FIG. 5 taken along lines 6—6 of FIG. 5; and FIG. 7 is a cross-sectional view of the pivot support member of FIG. 5 taken along lines 7—7 of FIG. 5.

BEST MODE FOR CARRYING OUT THE INVENTION

Figure 1:
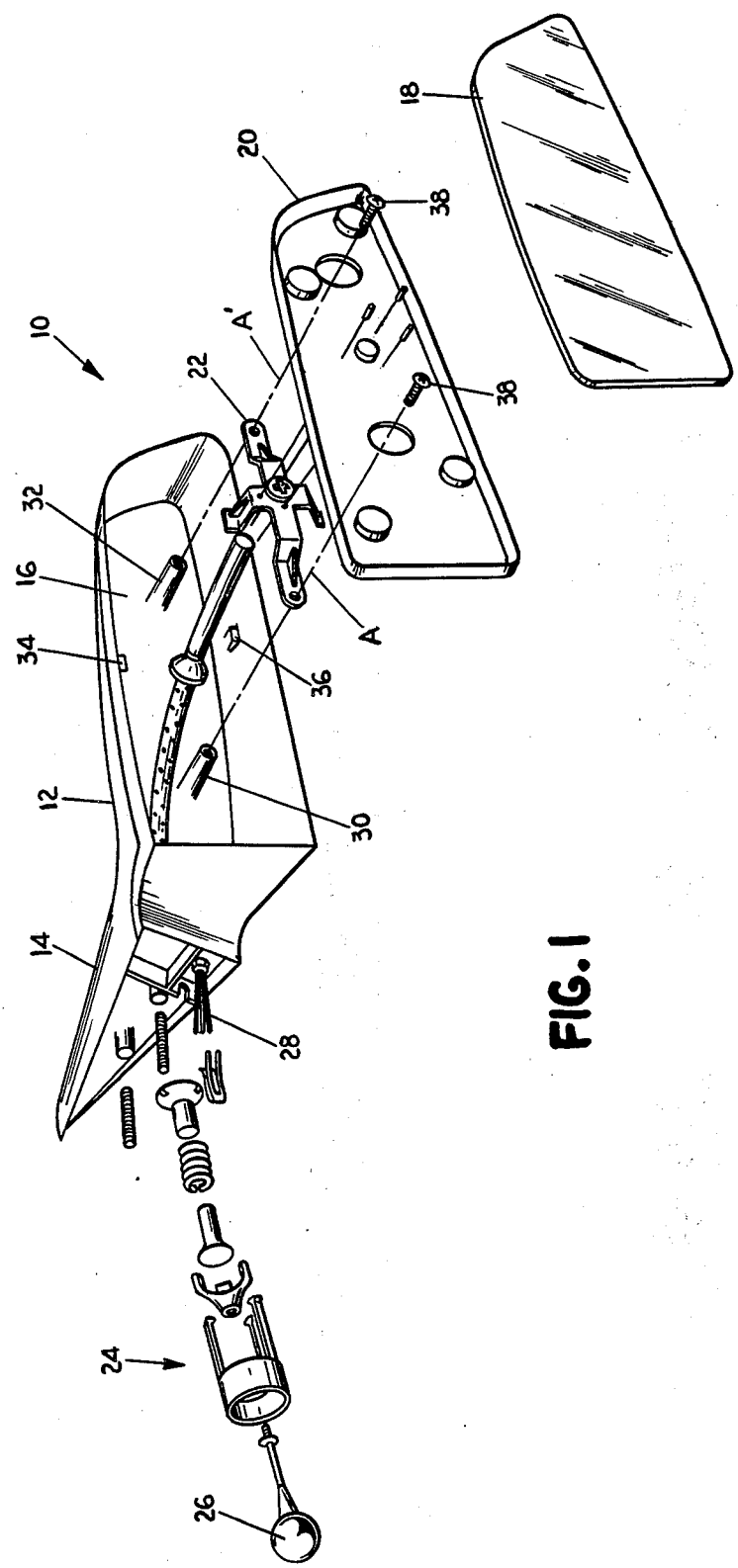
FIG. 1 is an exploded view of a mirror assembly in accordance with the present invention.

FIG. 1 shows a mirror assembly 10 in accordance with the invention. The mirror assembly 10 illustrated in FIG. 1 is a remote control mirror assembly which will be described with reference to FIGS. 1 through 4. Alternatively, a second embodiment of the invention having a mirror which is directly adjusted by hand can also be constructed and will be described with reference to FIGS. 5 through 7.

The mirror assembly 10 includes an aerodynamically-shaped housing shell 12 including an aerodynamically-shaped support leg 14. The leg 14 is adapted to be secured to the exterior of a vehicle. The housing shell 12 defines an opening 16 in which is mounted a mirror 18. The mirror 18 is mounted to a mirror support 20. The mirror 18 is secured to the support 20 at the peripheral edge thereof by an adhesive or similar material. The assembly of the mirror 18 and mirror support 20 is mounted to the housing shell 12 by means of a pivot support member 22 which will be described in greater detail below.

The mirror assembly 10 shown in FIG. 1 is remotely controlled and includes a control mechanism 24 such as a conventional Bowden wire control. The Bowden wire control assembly 24 illustrated in FIG. 1 is operated by means of a control lever 26 operatively connected with three shielded cable wires 28 which extend through the leg 14 and housing shell 12 and which are connected to the back surface of the mirror support 20. The wires 28 pass through the pivot support member 22. The control mechanism 24 includes biasing means such as coil springs which urge the mirror assembly against the pivot support member 22. The particular mechanism by which the mirror is pivoted for adjustment and by which the mirror is mounted for pivoting movement is described in greater detail in U.S. Pat. No. 4,003,271, issued Jan. 18, 1977 to Stelma and incorporated herein by reference.

Within the housing shell 12 and integrally formed therewith are two laterally spaced apart elongate studs 30 and 32. The studs 30 and 32 provide a means for mounting the mirror assembly 18, 20 and pivot support member 22 to the housing shell 12 as will be described in greater detail below. The centerlines of studs 30, 32 are designated as A and A'. The interior of the housing 12 further includes two flanges 34, 36 formed in the interior of the shell 12. Flange 34 is formed on the upper inner surface of the housing shell 12 while flange 36 is formed on the lower inner surface of the housing shell 12. The distance between flanges 34, 36 is designated as C-C'. Screws 38 secure the pivot support member 22 to the studs 30 and 32 and thus to the housing 12. The housing 12 is preferably molded or die cast with the studs 30, 32 and flanges 34, 36 being integrally formed with the housing 12 during the die casting or molding operation.

Turning to FIGS. 2 through 4, the particular configuration of one embodiment of the pivot support member 22 is shown. With reference to FIG. 2, it can be seen that the pivot support member 22 has four arms 40-46 disposed at right angles to each other and radially arranged about a central hub 70. When the pivot support member 22 is mounted to the housing 12, the opposing arms 40 and 42 are horizontal while opposing arms 44 and 46 are vertical.

As can be seen in FIGS. 2 and 4, arms 40 and 42 each have a first straight section 48 adjacent the hub 70, an angled portion 50 offset from the straight section 48 and a second straight section 52 extending from the distal portion of angled section 50. A reinforcing rib 54 is integrally formed with the three sections of the arm 40, 42. The entire arm is preferably die cast from zinc or a like material. At the outer end of each arm 40 and 42 is a through hole 55 through which screw 38 passes to mount the pivot support 22 to the stud 30, 32 in the housing 12. The centerlines of through holes 55 are designated as B and B'. Integrally formed with the arms 40, 42 and extending from the back surface thereof is a semicircular shoulder 56 which nests against the stud 30, 32 when the pivot support member 22 is mounted to the housing 12.

As can be seen from FIGS. 2 and 4, the length of one of the arms 40, 42 is greater than the other arm. The two arms 40, 42 can be formed in a variety of lengths and configurations, all of which include a shoulder 56 as described above. The particular configuration of the arms 40, 42 is selected so as to fit the housing shape.

With reference to FIGS. 2 and 3, it can be seen that the vertical arms 44, 46 also include three sections, a first straight section 58 adjacent the hub 70, an angled section 60 offset from the straight section 58, and a straight section 62 extending outwardly from the end of the angled section 60. Integrally formed with the three sections of the arms 44, 46 is a reinforcing rib 64. At the end portions of each of the straight sections 62 is a lip 66. The distance between lips 66 before mounting is designated as D-D'. As can be seen in FIG. 3, the lips 66 engage the corresponding flanges 34, 36 in the interior of the housing 12. Again, the vertical arms 44, 46 can have a variety of configurations and lengths to fit the housing 12. In the embodiment shown in FIG. 3, for example, the lower arm 46 is longer than the upper arm 44.

The central hub 70 about which the four arms 40-46 are disposed includes a projection 72 having a cross-like cross-sectional configuration. The projection 72 extends outwardly from a spherically shaped dish-like surface 74 formed on the surface of the hub 70. The cross-like projection 72 is received within a mating recess in the back surface of the mirror support 20 as shown in U.S. Pat. No. 4,003,271. The details of the connection of the projection 72 to the mirror support 20 will not be described herein and reference is made to the above-referenced U.S. Pat. No. 4,003,271 for further details. Disposed about the hub 70 are three sockets 76 having bores therethrough through which the control wires 28 pass to be connected to the rear of the mirror support 20. Again, reference is made to the above-referenced U.S. Patent for further details of this control mechanism.

When the pivot support member 22 is mounted in place, the horizontal arms 40 and 42 are placed in compression while the vertical legs 44, 46 are in tension. In this regard, the distance between the centerlines of the through holes 55, B-B', in the pivot support member 22 is slightly greater than the distance between the centerlines of bores in the two studs 30, 32, A-A'. Thus, when the pivot support member 22 is secured to the studs 30, 32, the studs 30, 32 are spread apart. Accordingly, when the arms 40, 42 are secured to the studs 30, 32 by the screws 38, the difference in distances between the studs 30, 32 and through holes 55 causes the arms 40, 42 to be compressed.

In turn, the distance between the lips 66 on the vertical arms 44, 46, D-D', is less than the distance C-C', between the flanges 34, 36 on the interior of the housing 12 before mounting of the support member 22. It can be seen that the lips 66 engage the flanges 34, 36 in an interference-type fit. Thus, when the pivot support member 22 is mounted in place so that the pairs of lips and flanges engage each other, the vertical arms 44, 46 are slightly spread apart to place them in tension. The reactive force due to the arms 44, 46 engaging the housing 12 causes the housing to be preloaded in compression. This preloading of the arms of the pivot support member reduces the vibrational effects of vehicle travel on the mirror and also adds to the strength of the shell due to the prestressing thereof by means of the vertical arms. Vibration of the mirror independent from the vibration of the car is annoying to the driver and blurs vision. By placing the pivot support mechanism under a preload and then attaching the mirror thereto, the effects of this vibration can be reduced. The four-arm mounting with all arms being preloaded provides stability to reduce vibration in that the preloading provides a resisting force to the force generated by vibration of the mirror.

Further, the particular configuration of the pivot support member with the offset portions on the vertical and horizontal arms reduces the size of the mounting studs 30, 32. In the past, the use of long mounting studs created a problem when die casting or molding a part in that shrink holes were formed in the exterior of the housing. The shorter studs have less of a tendency to cause shrink holes to form in the housing during die casting.

A second embodiment of a pivot support member is shown in FIGS. 5 through 7. The pivot support member 100 shown therein is used in a mirror which is directly adjusted by hand.

The support 100 includes four arms 102–108 disposed perpendicular to each other and about a central hub 114. The horizontal arms 102, 104 each include a reinforcing rib 110 while the vertical arms 106, 108 include a similar reinforcing rib 112. The reinforcing ribs 110, 112 are integrally formed with the arms 102–108 during die casting thereof. The hub 114 includes a hole 116 in the center thereof which receives a mating projection on the back surface of a mirror support. The projection on the mirror support and the hole 116 form a pivoting connection which allows the mirror to be manually moved within its housing for adjustment. Extending from the horizontal arms 102, 104 and integrally formed therewith are elongate pins 118 which extend towards the back surface of the mirror. The pins 118 restrain the mirror from rotation about an axis through the pivot center and perpendicular to the plane of the mirror surface, while allowing rotation about the other orthagonal axes.

Each of the horizontal arms 102, 104 includes a shoulder 120 at its end portion similar to the shoulder 56 described above with reference to the first embodiment of the invention. The shoulder 120 is in the form of a semicircular projection which nests against the studs 30, 32 formed within the housing 12. The end of each arm 102, 104 includes a hole 121 through which screws 38 pass for attachment to studs 30, 32. The centerlines of holes 121 are designated as F and F'.

Likewise, the vertical arms 106, 108 each include a lip 122, as shown in FIG. 7, which engages a mating flange 34, 36 formed on the interior of the housing 12, as described above. The distance between lips 122 before mounting is designated H-H'.

Similar to the first embodiment, the distance between F-F' the centerlines of the through holes 121 in the horizontal arms 102, 104 is greater than the distance A-A' between the bores in the studs 30, 32. Thus, when the pivot support member 100 is mounted in place, the studs 32 are spread apart so as to place the horizontal arms 102, 104 in compression. Likewise, the distance H-H' between lips 122 of the vertical arms 106, 108 of the pivot support member 100 before mounting is less than the distance C-C' between the corresponding flanges 34, 36 on the interior of the housing. Thus, when the pivot support member 100 is mounted in place so that the corresponding lips and flanges engage each other in an interference-type fit, the vertical arms are placed in tension with the housing being placed in compression. Again, this preloading of the pivot support member 100 reduces the effects of independent vibration of the mirror during travel of the vehicle. Further, the prestressing of the housing strengthens the shell.

The above-described support members 22, 100 can be formed in a variety of configurations in order to fit a particular housing. The arms can either be straight or have an offset configuration, with the size of the offset between each of the arms varying if the mirror housing has a nonsymmetrical configuration. Further, the lengths of the arms and the particular orientation of the arms in the housing can be varied to fit the shell as needed. In any case, the lengths of the arms and the orientation and configuration is selected so that when the pivot support member is secured in place, the arms are preloaded in order to reduce the effects of vibration. Although the invention has been described with reference to a support having horizontal arms in compression and vertical arms in tension, the preloading of the arms can be reversed.

Accordingly, the above-described pivot support provides a simple mechanism for reducing mirror vibrations which occur during vehicle travel. Further, the part is relatively simply made and the offset arm can be used to reduce the length of the mounting studs in the housing and thus decrease the tendency to form shrink holes in the housing which can occur during die casting of the housing. The mirror mounting is not exposed to view and thus does not detract from the aesthetic appearance of the mirror housing. The mounting can be used in both right and left hand mirrors. Further, the pivot support member is self locating in that it cannot be mounted in a reversed orientation.

The foregoing description and drawings are merely illustrative of the invention and are not intended to limit the invention to the above-described embodiments. Variations and changes which may be obvious to one skilled in the art may be made without departing from the scope and spirit of the invention as defined in the appended claims.

The embodiments of the invention in which an exclusive property or privilege is claimed are defined as follows:

1. A mirror assembly for a vehicle comprising:
   a housing;
   a mirror;
   attachment means in said housing for supporting said mirror in said housing;
   support means for pivotably mounting said mirror to said attachment means;
   said support means including first and second prestressed arm means for mounting said support means each said arm means having a pair of opposing arms, to said attachment means, said first arm means being mounted in tension and said second arm means being mounted in compression;
   wherein said prestressing of said first and second arm means serves to reduce vibration of the mirror relative to the vehicle and thereby substantially reduce blurring of images on said mirror.

2. The mirror assembly of claim 1 wherein said attachment means includes stud means for engaging one of said first and second arm means and flange means for engaging the other of said first and second arm means.

3. The mirror assembly of claim 2 including fastening means for securing said one arm means to said stud means.

4. The mirror assembly of claim 3 wherein said fastening means comprises a threaded fastener received in a bore in said stud means and passing through an aperture in said one arm means.

5. The mirror assembly of claim 4 wherein said one arm means is said second arm means and the distance between the centerlines of the bores in said stud means is less than the distance between the centerlines of the apertures in said one arm means so that said one arm means are compressed when the arm means are secured to said stud means.

6. The mirror assembly of claim 2 wherein the other of said arm means include lip means for engaging said flange means.

7. The mirror assembly of claim 4 wherein said other arm means is said first arm means and the distance between said lip means is greater than the distance between said flange means so that said arm means are prestressed in tension and said housing is compressed when the lip means and flange means are engaged.

8. The mirror assembly of claim 1 wherein said first and second arm means extend from a central hub of said support means.

9. The mirror assembly of claim 8 wherein said first and second arm means are offset relative to said central hub.

* * * * *

UNITED STATES PATENT AND TRADEMARK OFFICE
CERTIFICATE OF CORRECTION

PATENT NO. : 4,411,403
DATED : 10/25/83
INVENTOR(S) : DAVID L. TOMSU

It is certified that error appears in the above-identified patent and that said Letters Patent are hereby corrected as shown below:

Column 2, line 45, "the" (second instance) should be --die--

Column 7, lines 22-27, should read:

said support means including first and second prestressed arm means for mounting said support means to said attachment means, each said arm means having a pair of opposing arms, said first arm means being mounted in tension and said second arm means being mounted in compression;

Column 8, line 21, "4" should be --6--

Signed and Sealed this

Twenty-eighth Day of August 1984

[SEAL]

Attest:

GERALD J. MOSSINGHOFF

Attesting Officer  Commissioner of Patents and Trademarks